United States Patent [19]
Oono et al.

[11] Patent Number: 6,014,523
[45] Date of Patent: Jan. 11, 2000

[54] TIME-SHARING DRIVE APPARATUS FOR MOTOR OF CAMERA

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 09/000,945

[22] Filed: Dec. 30, 1997

[30] Foreign Application Priority Data

Jan. 6, 1997 [JP] Japan ..................................... 9-000413

[51] Int. Cl.[7] .................................................. G03B 17/00
[52] U.S. Cl. .............................. 396/48; 396/301; 396/303
[58] Field of Search ..................................... 396/301, 303, 396/48

[56] References Cited

U.S. PATENT DOCUMENTS 3,911,449 10/1975 Watanabe .
4,446,526 5/1984 Iwanade .
5,202,721 4/1993 Kobayashi et al. .
5,467,200 11/1995 Ohsawa et al. .
5,671,449 9/1997 Shimizu .

FOREIGN PATENT DOCUMENTS 2303222 2/1997 United Kingdom .

*Primary Examiner*—Russell Adams
*Attorney, Agent, or Firm*—Greenblum & Bernstein, P.L.C.

[57] ABSTRACT

A time-sharing drive apparatus for a camera having a plurality of motors includes a motor drive control system which alternately drives the motors in a time-sharing control. When the camera includes a zoom lens provided with a first stationary lens group, a second movable lens group and a third movable lens group, the motors are composed of a first motor which opens and closes a diaphragm of the zoom lens, a second motor which moves the second lens group, and a third motor which drives the third lens group. The motor drive control system which drives the first, second and third motors is controlled via a time-sharing system.

23 Claims, 19 Drawing Sheets

Motor M2

Motor M3

Motor M1

TIME-SHARING DRIVE APPARATUS FOR MOTOR OF CAMERA

BACKGROUND OF THE INVENTION

1. Field of the Invention

The present invention relates to a time-sharing drive apparatus for a motor of a camera, which can be advantageously used particularly with a digital camera.

2. Description of the Related Art

In recent years, various kinds of electronic still cameras such as a digital camera have been proposed. In recent digital cameras which have been miniaturized, a liquid crystal color display is used in place of a view finder. To miniaturize the digital camera, a battery to be loaded therein must be made small. To increase the service life of the battery, the power consumption of the electronic elements must be conserved, minimizing the maximum power consumption thereof. However, the power consumption has been increased due to the use of the color liquid crystal display.

Moreover, the digital camera has a plurality of motors including a zoom motor for a power-zoom operation, a focusing motor for a focus control and a diaphragm pulse motor for driving a diaphragm. In such a digital camera, the zooming operation is carried out by driving the zoom motor while observing an object; the focusing operation is carried out by the focusing motor; and the opening and closing operation of the diaphragm is carried out by the diaphragm pulse motor. These operations sometimes take place at the same time. If the different operations simultaneously take place, a large amount of current flows and hence, energy loss is increased due to the internal resistance of the battery and a mal-function of the electronic devices may occur due to the voltage drop. To prevent this from occurring, in a digital camera having a power zoom lens, it is necessary to reduce the peak current upon starting the motor such as a zoom motor, to thereby reduce the power consumption.

SUMMARY OF THE INVENTION

It is an object of the present invention to provide a time-sharing drive apparatus for a motor of a camera in which the total power consumption and the maximum power consumption can be reduced.

To achieve the object mentioned above, according to the present invention, there is provided a time-sharing drive apparatus for a camera having two or more motors, comprising a motor drive control system for alternately driving the motors employing a time-sharing method.

According to an aspect of the present invention, when the camera includes a zoom lens provided with a first stationary lens group, a second movable lens group and a third movable lens group, the motors are composed of a first motor which opens and closes a diaphragm of the zoom lens, a second motor which moves the second lens group, and a third motor which drives the third lens group. The motor drive control system which drives the first, second and third motors is controlled via a time-sharing system. In an embodiment, the motor drive control system divides one cycle into four allotments of time and allocates two allotments for driving the second motor and allocates one allotment each for driving the first and third motors, respectively. The above-mentioned cycle is repeated driving the first, second and third motors.

The present disclosure relates to subject matter contained in Japanese patent application No. 09-413 (filed on Jan. 6, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

The illustrated embodiment is applied to a digital camera having a power zoom lens. The digital camera includes a zoom lens portion having a power zoom photographing lens and a CCD image pickup device, and a camera portion having an image recorder, such as a memory card and a color liquid crystal display, etc.

The structure of the zoom lens portion will be discussed below. The lens system is composed of three lens groups consisting of a first stationary positive lens group L1, a second movable negative lens group L2 and a third movable positive lens group L3. The lens system is a variable focus lens system in which the zooming operation is carried out by moving the second and third lens groups L2 and L3 and the focusing operation is carried out by moving the second lens group L2. The relative position of the second lens group L2 and the third lens group L3 is controlled without using a cam groove. The positions of the second and third lens groups L2 and L3 are effected by an open-loop control system and a closed-loop control system, respectively, in accordance with set focal-length data (position data of the second lens group L2) and object-distance data.

Figure 1:
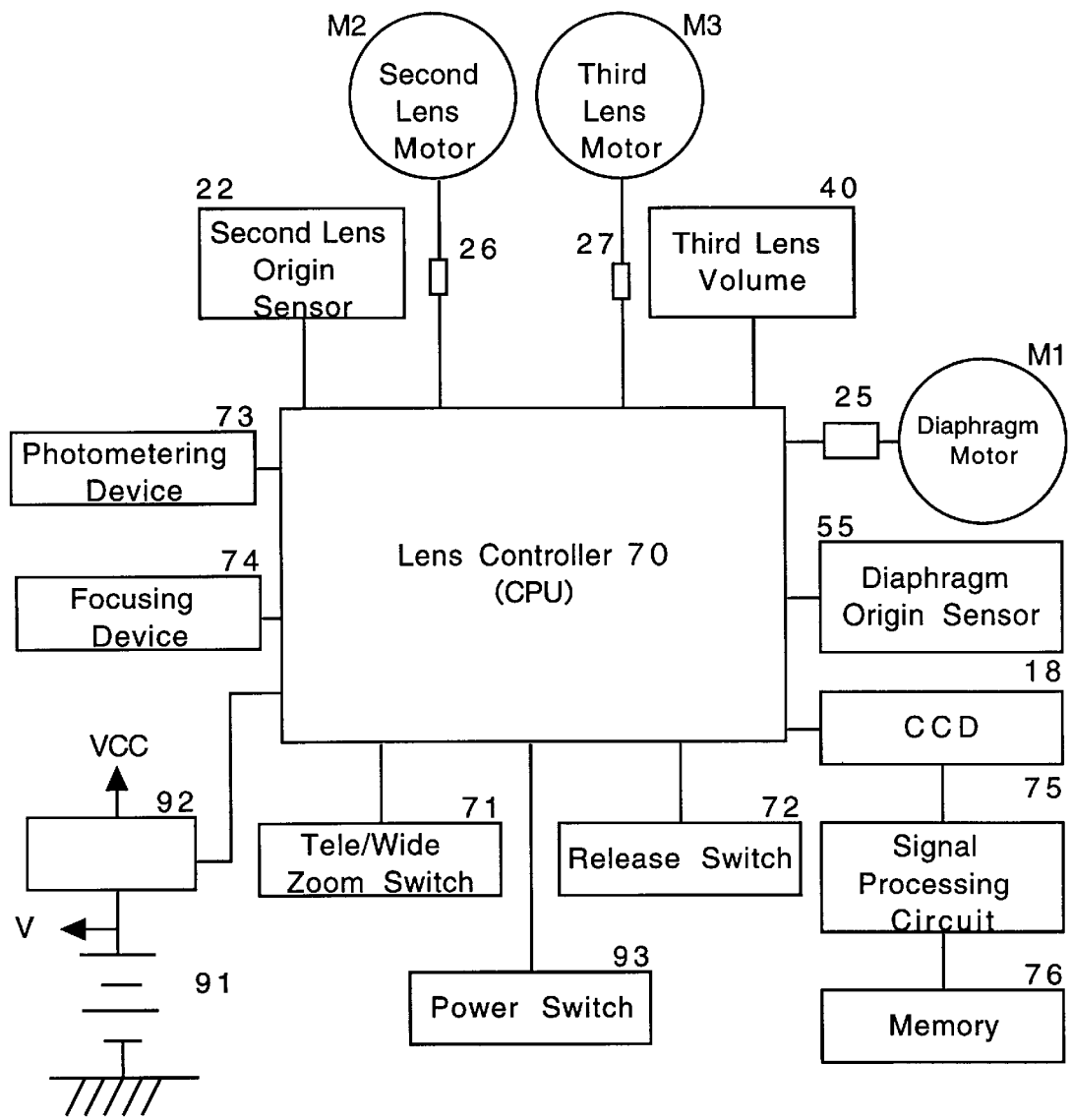
FIG. 1 is a block diagram of a control system for a zoom lens according to an embodiment of the present invention.

The lens control system provided in the zoom lens portion will be explained below with reference to FIG. 1. Connected to the lens controller (CPU) 70 is a diaphragm pulse motor (first motor) M1 for driving the diaphragm, a second lens pulse motor (second motor) M2 for driving a second lens group L2 of the zoom lens; a third lens motor (third motor) M3 for driving the third lens group L3 of the zoom lens through motor drivers 26, 27 and 28, respectively; a second lens initial position sensor 22 for detecting the origin of the second lens group L2, a third lens volume 40 for detecting the absolute position of the third lens group L3, a diaphragm initial position sensor 55 for detecting the initial position (full-open position) of the diaphragm, a color image pick-up device (CCD) 18, a zoom switch 71 having a tele-switch and/or wide-switch, a release switch 72, a photometering device 73 for measuring the object brightness, and a focusing device 74 for detecting the object distance are connected to the lens CPU 70. The photometering device 73 is usually constituted by the CCD 18 but is shown as a separate member for clarity. The focusing device 74 can be either a passive type or an active type. In the illustrated embodiment, a passive type of focusing device 74 is used to detect the defocus. Data of an optical image formed on the CCD 18 is converted to an electric image signal which is recorded in a memory 76 as digital image data through a signal processing circuit 75.

A battery 91 which supplies electric power to the electronic devices mentioned above is provided in the camera body, so that when the power switch 93 is turned ON, the power is supplied to the electronic devices of the zoom lens portion directly or through a regulator 92. For clarity, it is assumed that these devices are provided in the zoom lens and that the power switch 93 is connected to the controller 70, so that when the latter is turned ON, the power can be supplied to the electronic devices through the regulator 92. The power switch 93 functions also as a photographing mode switch which is adapted to pick-up an image when the release switch 72 is turned ON and to record the digital image signals in the memory 76.

The motor time-sharing drive control system according to the present invention will be described below with reference to the timing charts shown in FIGS. 2 and 3. The drive control is generally controlled by the lens controller 70.

The following discussion will be first addressed to the basic drive operation of the zoom lens. When the zoom switch 71 is turned ON, the second lens pulse motor M2 and the third lens motor M3 are driven in the telephoto direction or wide-angle direction to move the second and third lens groups L2 and L3. Moreover, the focal length is detected in accordance with the movement of the third lens group L3 through the third lens volume 40 from the origin thereof. The lens controller 70 detects the driving pulses of the second lens pulse motor M2 to move the focal position of the second lens group L2 in accordance with the focal length thus detected and the object distance measured by the focusing device 74. Consequently, the second lens group L2 is moved to and held in the focal position.

Figure 2:
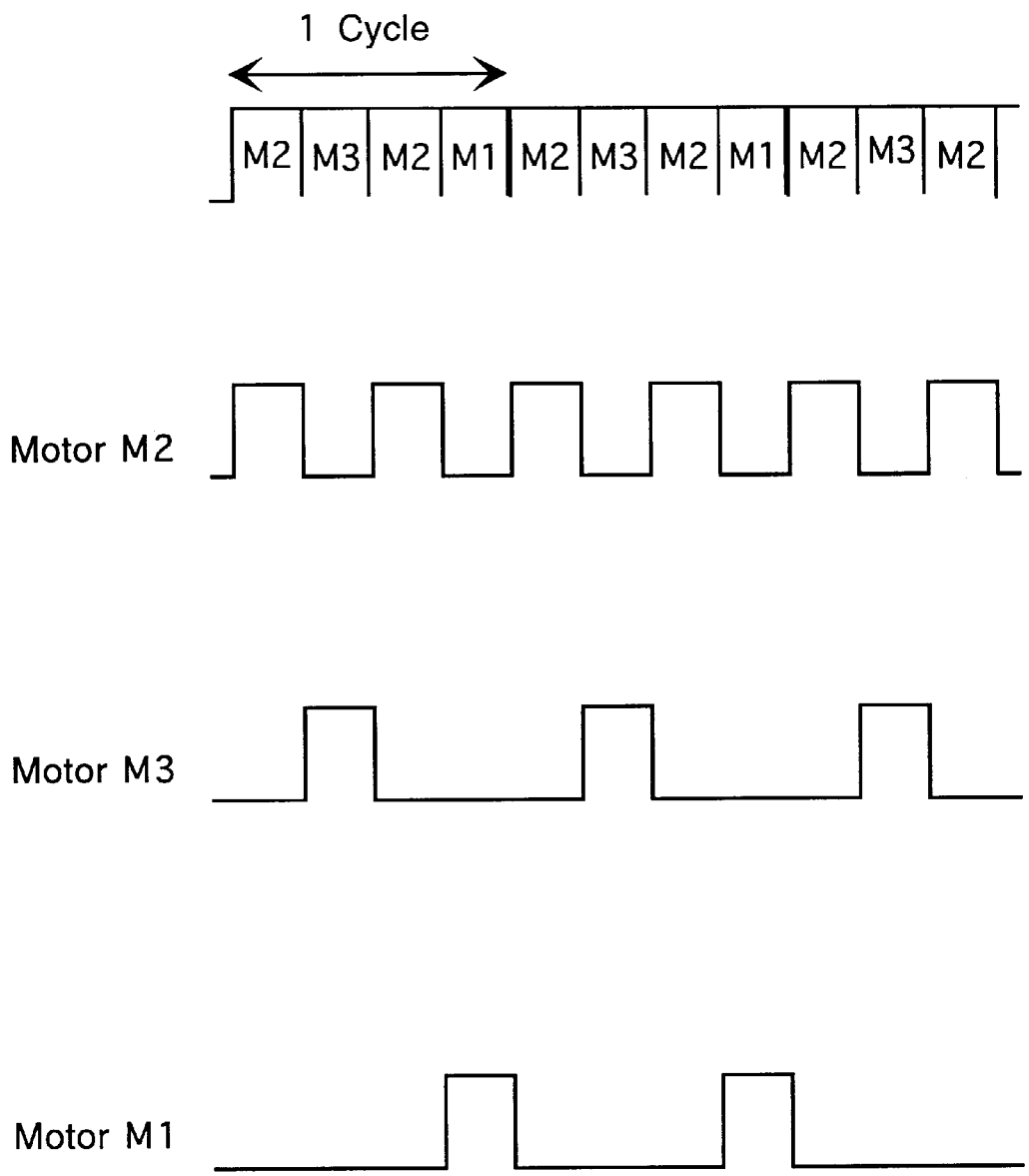
FIG. 2 is an example of a timing chart of the operations of a zoom lens shown in FIG. 1.

In this state, the timing chart when the zoom switch 71 is turned ON is shown in FIG. 2.

In FIG. 2, the second lens pulse motor M2 is driven by one pulse in the first time allotment, the third lens motor M3 is driven by one pulse in the second time allotment; the second lens pulse motor M2 is driven by one pulse in the third time allotment, the diaphragm pulse motor M1 is driven by one pulse in the fourth time allotment. These operations which correspond to one cycle are repeated while the zoom switch 71 is ON. Of course, if it is not necessary to drive (open or close) the diaphragm, no power is supplied to the diaphragm pulse motor M1, nor if it is not necessary or impossible to drive the second or third lens group L2 or L3, for example when it reaches the wide-angle extremity or telephoto extremity, no power is supplied to the motor M2 or M3. For instance, if the diaphragm motor M1 is stopped, the diaphragm motor M1 which would be otherwise supplied with the power in the above-mentioned cycle is not supplied with the power, as shown in FIG. 3.

Figure 3:
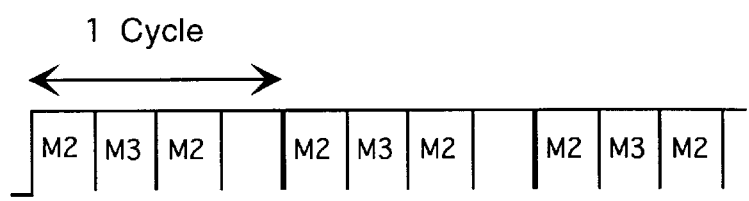
FIG. 3 is another example of a timing chart of the operations of a zoom lens shown in FIG. 1.
Figure 3:
Figure 3:
Figure 3:

The timing chart upon zooming is shown in FIG. 3. When the zoom switch 71 is turned ON, the lens CPU 70 divides one cycle into four allotments of time, i.e., a first, a second, a third and a fourth time allotment. In the first time allotment, the second lens pulse motor M2 is driven by one pulse; in the second time allotment, the third lens motor M3 is driven by one pulse; in the third time allotment, the second lens pulse motor M2 is driven by one pulse; in the fourth time allotment, no power is supplied to the second lens pulse motor M2 or the third lens motor M3. The drive of the four pulses corresponds to one cycle in which the second lens pulse motor M2 and the third lens motor M3 are driven. One cycle is, for example, 1 ms and each time allotment is, for example, 250 μs.

While the power switch 93 is ON, the photometering device 73, the focusing device 74 and the CCD 18 are cyclically actuated to detect the object brightness to thereby drive the diaphragm pulse motor M1 and measure the object distance to thereby drive the second lens pulse motor M2 in order to move the second lens group L2 to the focal position thus obtained. The image signals picked-up by the CCD 18 are displayed on a liquid crystal display (not shown). In the illustrated embodiment, no power is supplied to the third lens motor M3 in said one cycle, and the power is supplied to the second lens pulse motor M2 and the diaphragm motor M1 in the second and fourth time allotments, respectively.

Namely, when the lens controller 70 initiates a drive allotment order of M2, M3, M2, M1 for the pulse motors M1, M2, M3 per predetermined cycle, the drive allotment cycle is repeated in accordance with the operation of the zoom switch 71 so that when a motor has been allocated, the drive signal allowing power to be supplied to the motor is supplied via the motor driver.

As can be seen from the foregoing, the power is supplied to only one motor at one time, in the time-sharing drive control in the present invention, and hence, the power can be supplied by only one motor even at a maximum power consumption. If the power supply cycle of each motor is reduced, the operator's perception would be as if the stepping motors were driven simultaneously and continuously. Consequently, the operator has a good operation impression.

In the illustrated embodiment, although the cycle time for supplying the power to the second lens pulse motor M2 whose amount of drive is considered largest among the other motors is reduced, the cycle time can be identical for all the motors or can be different for each motor. For example, the motor which should stop within as short space of time as possible or the motor whose amount of drive is large or which requires long drive time can be supplied with the power at a shorter cycle and at a larger number of steps.

Figure 4:
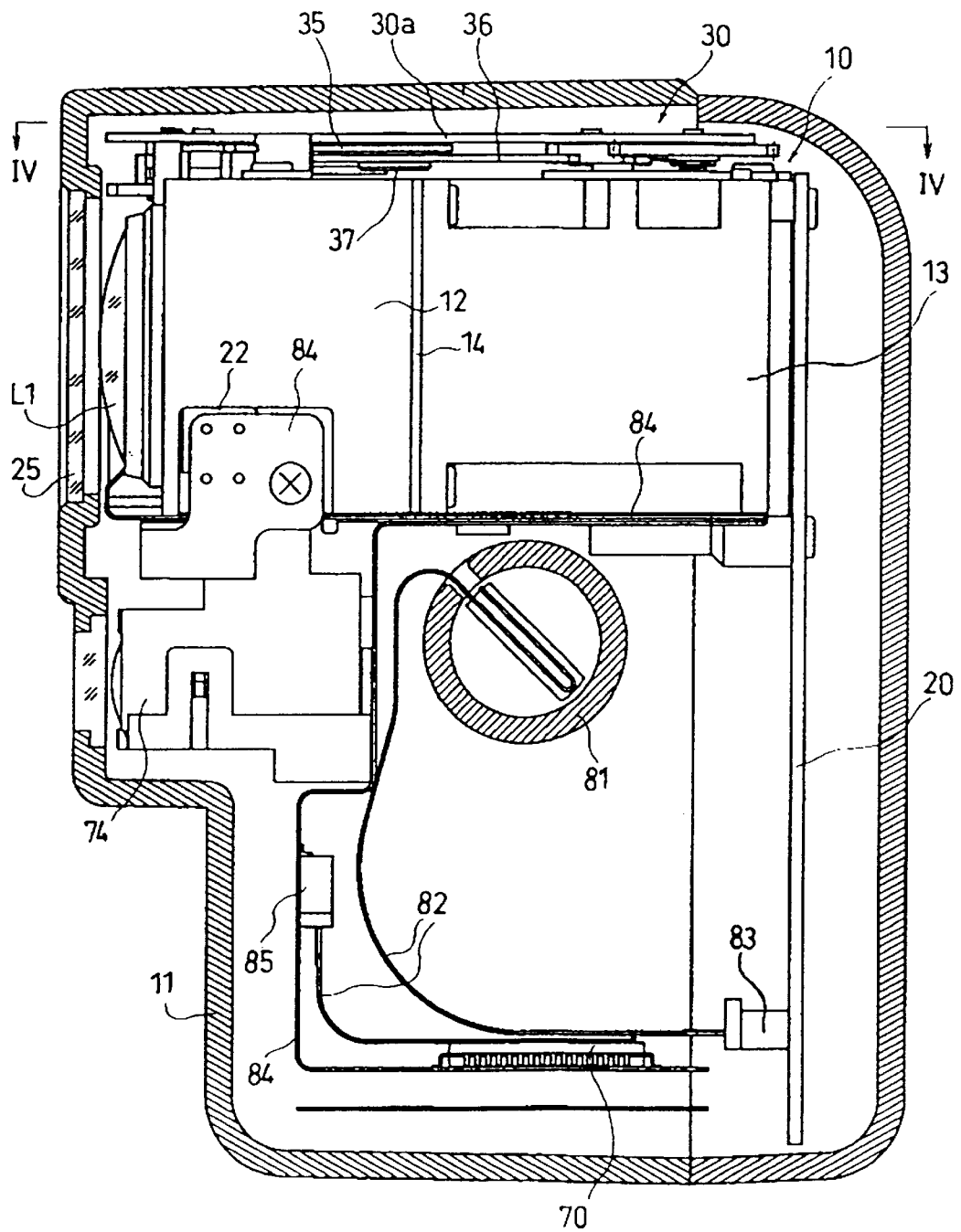
FIG. 4 is a left side view of a zoom lens barrel in which the case is sectioned, according to the present invention.
Figure 5:
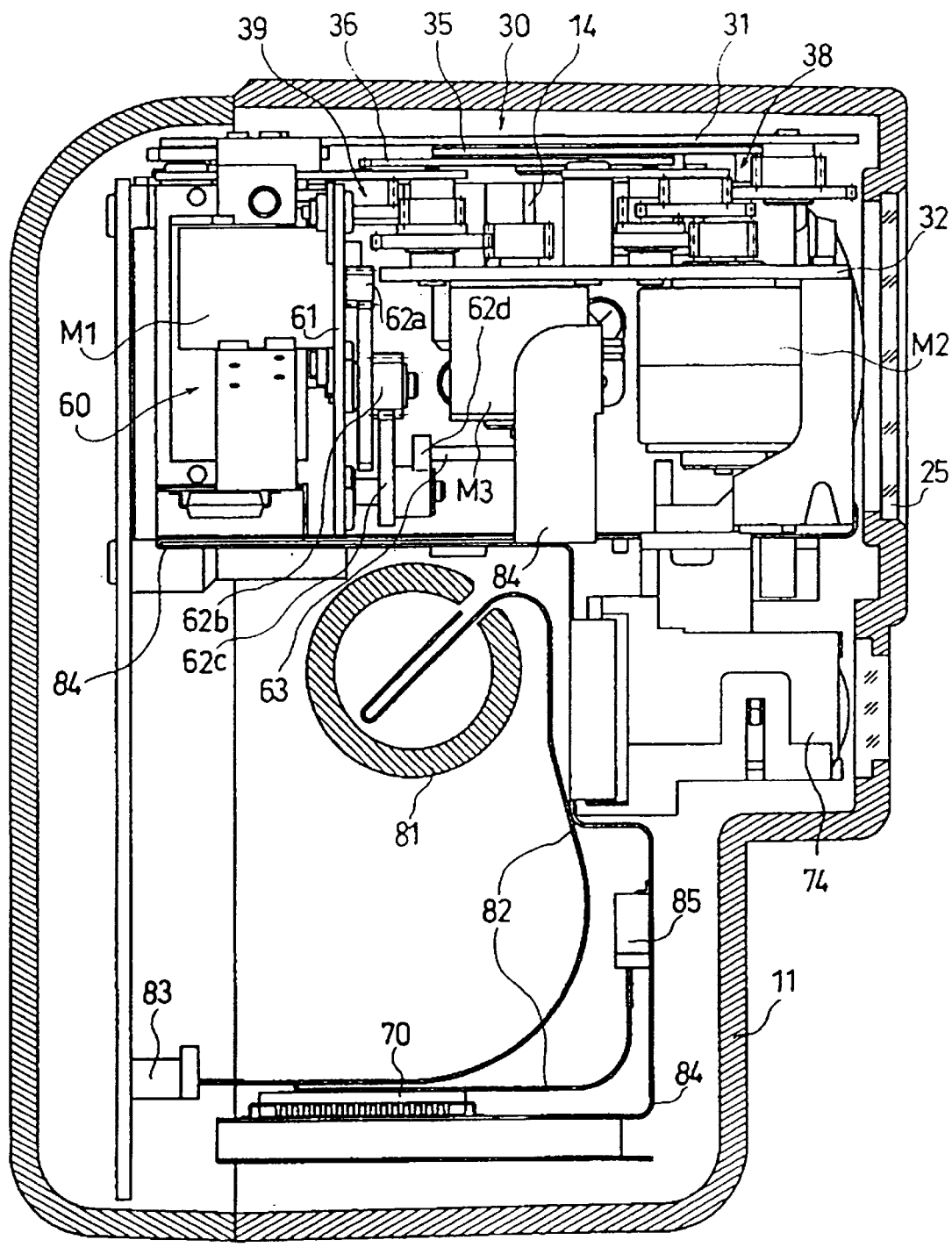
FIG. 5 is a right side view of FIG. 4.
Figure 6:
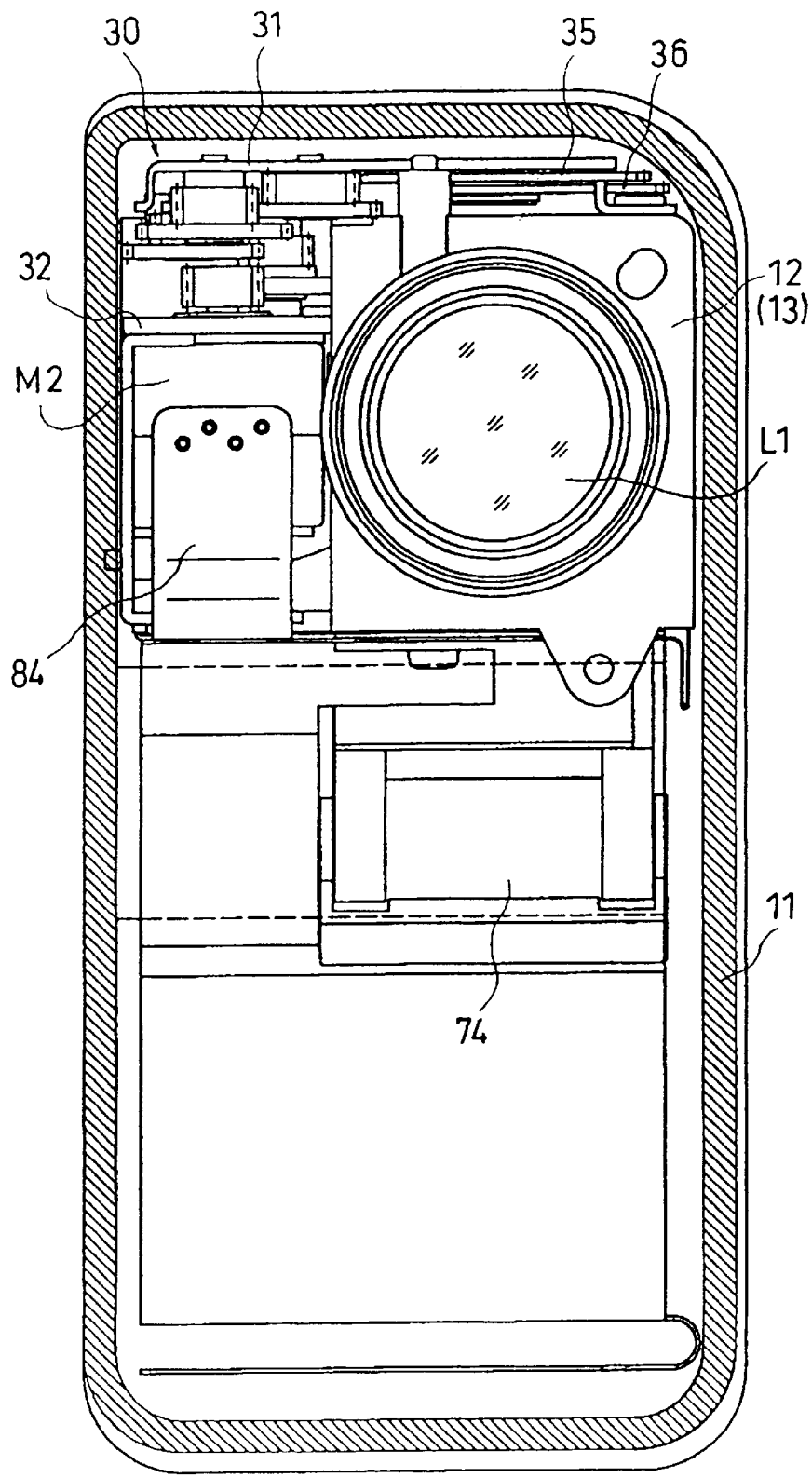
FIG. 6 is a front elevational view of FIG. 4.
Figure 7:
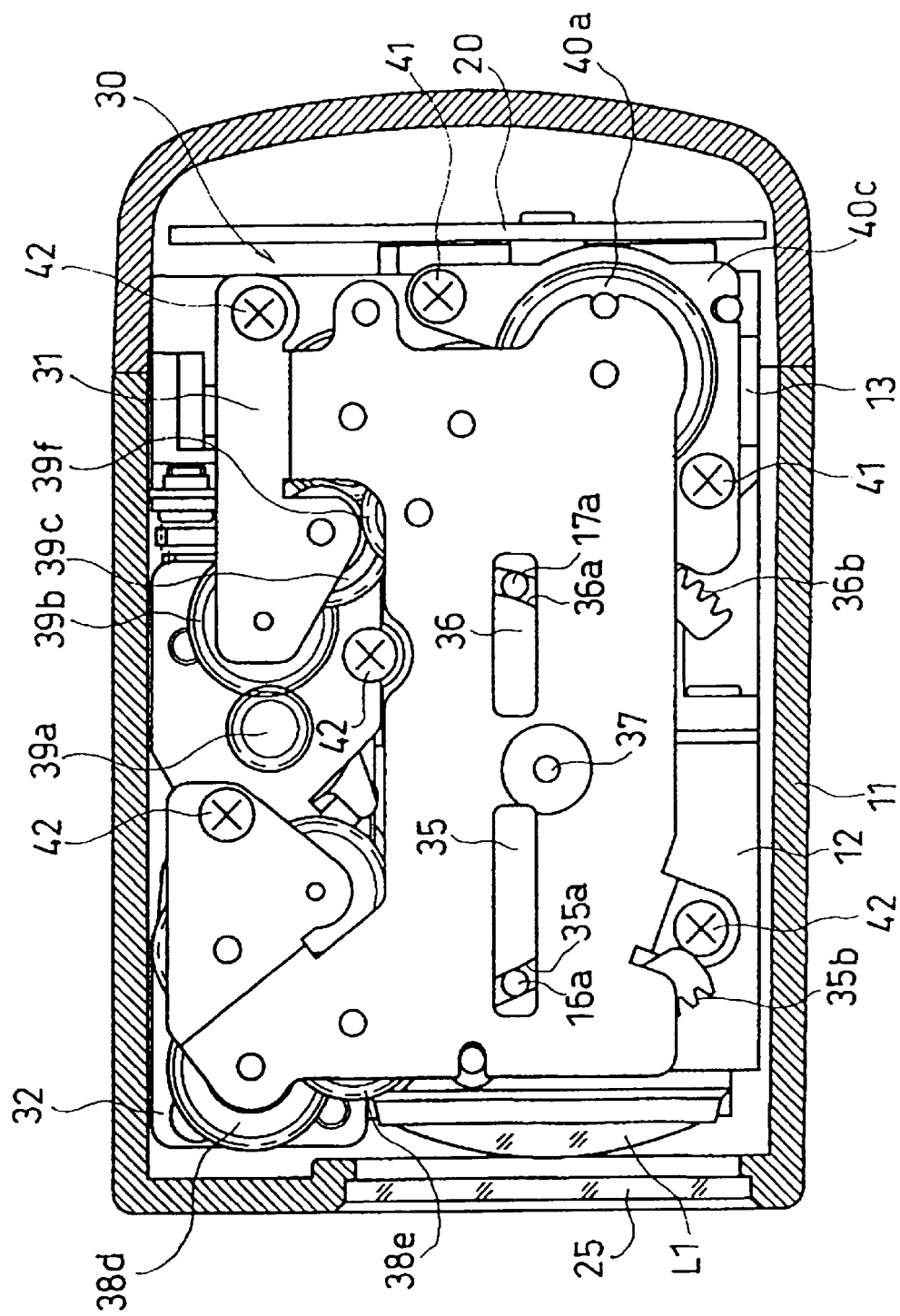
FIG. 7 is a sectional view taken along the line IV—IV in FIG. 4.
Figure 8:
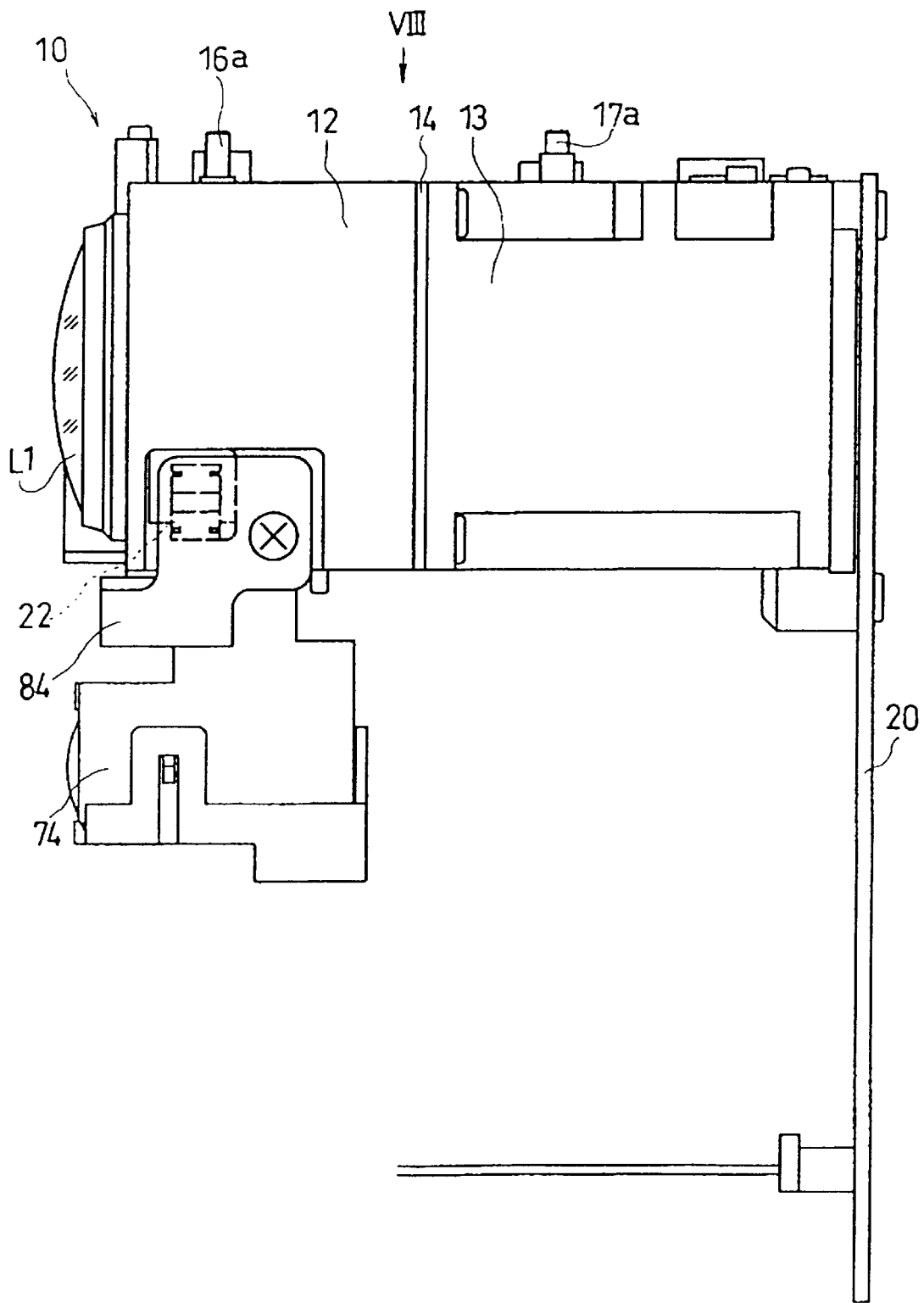
FIG. 8 is a left side view of a lens unit before a lens drive unit is incorporated.
Figure 9:
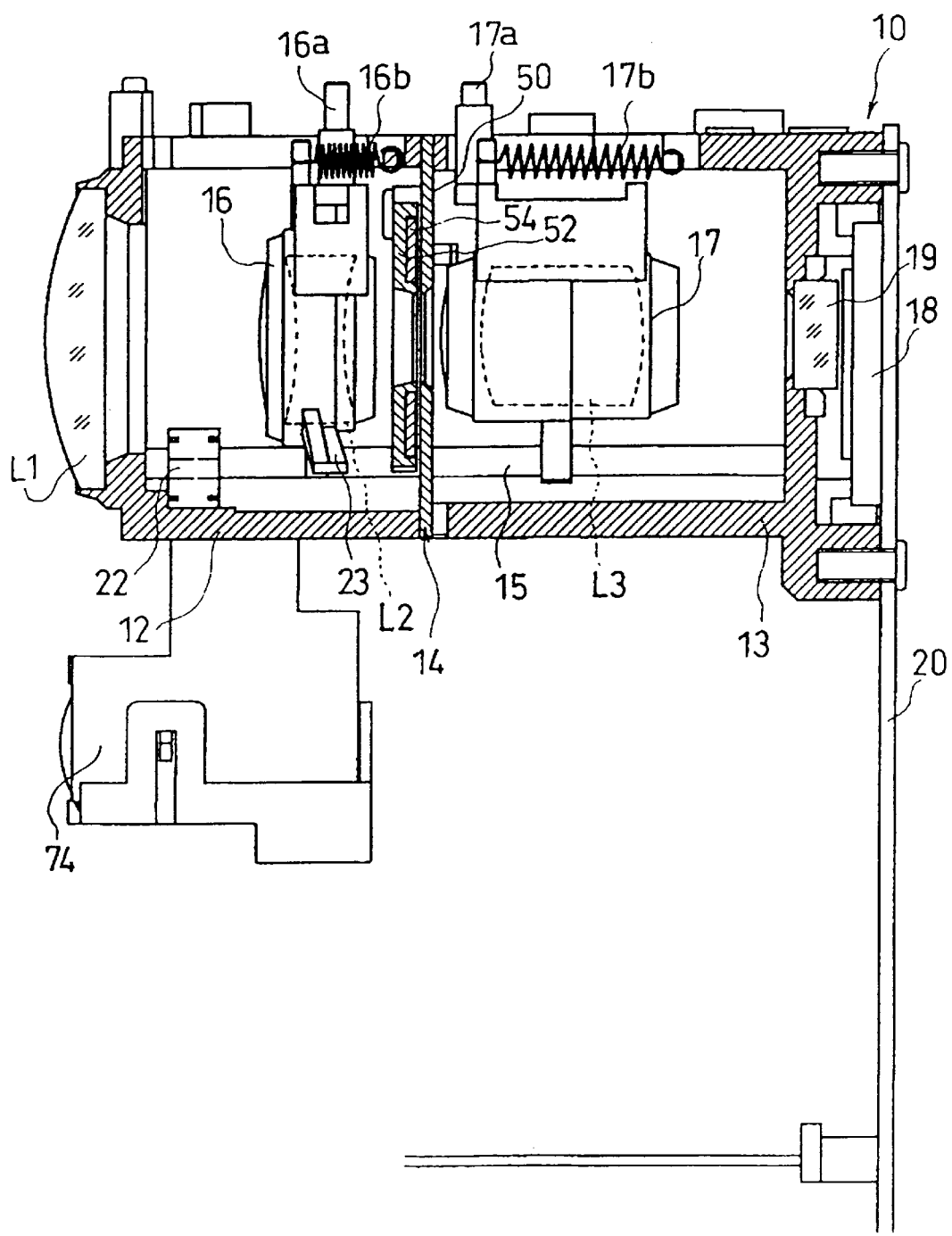
FIG. 9 is a longitudinal sectional view of FIG. 8 at a telephoto extremity.
Figure 10:
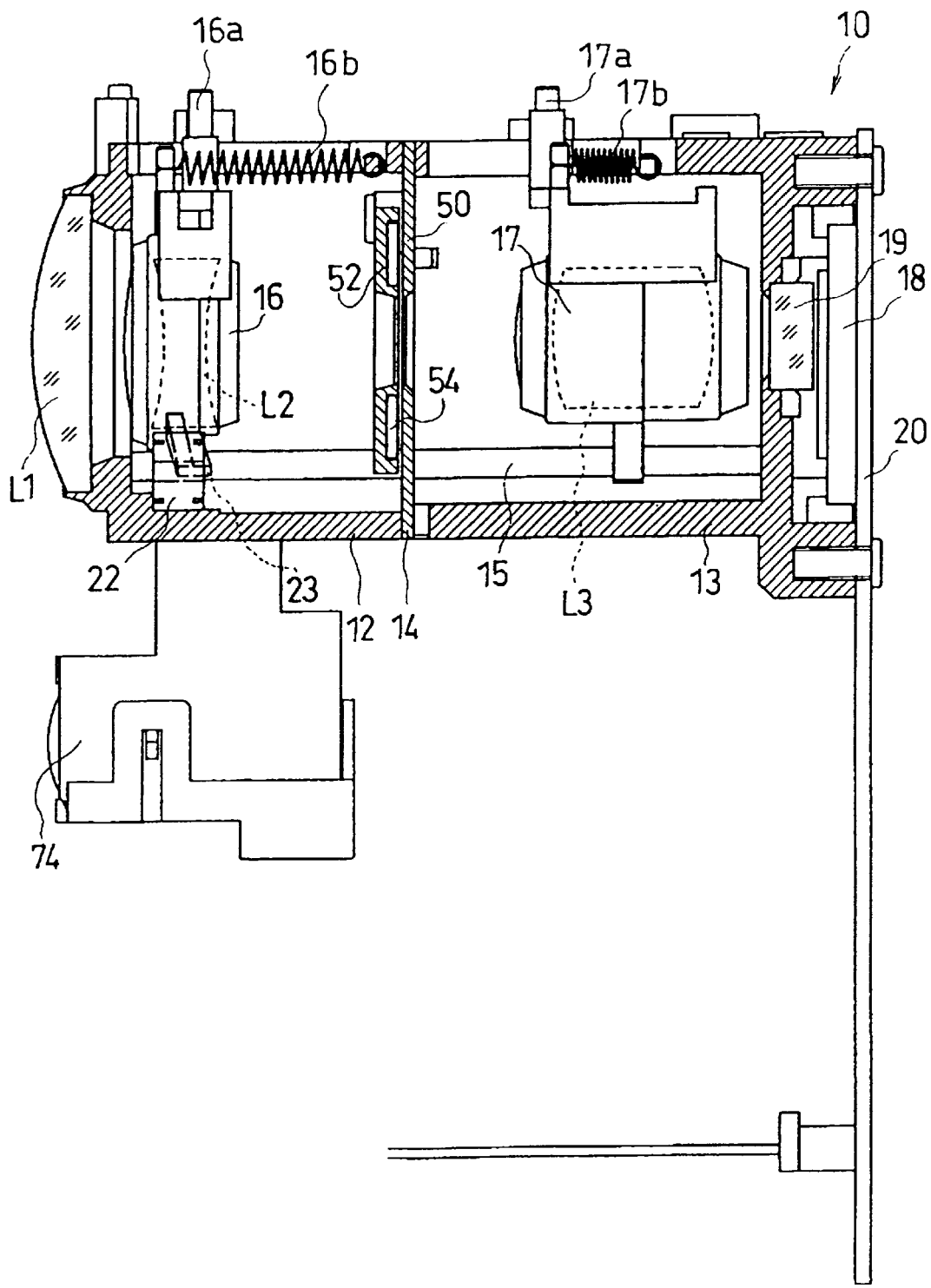
FIG. 10 is a longitudinal sectional view of FIG. 8 at a wide-angle extremity.
Figure 12:
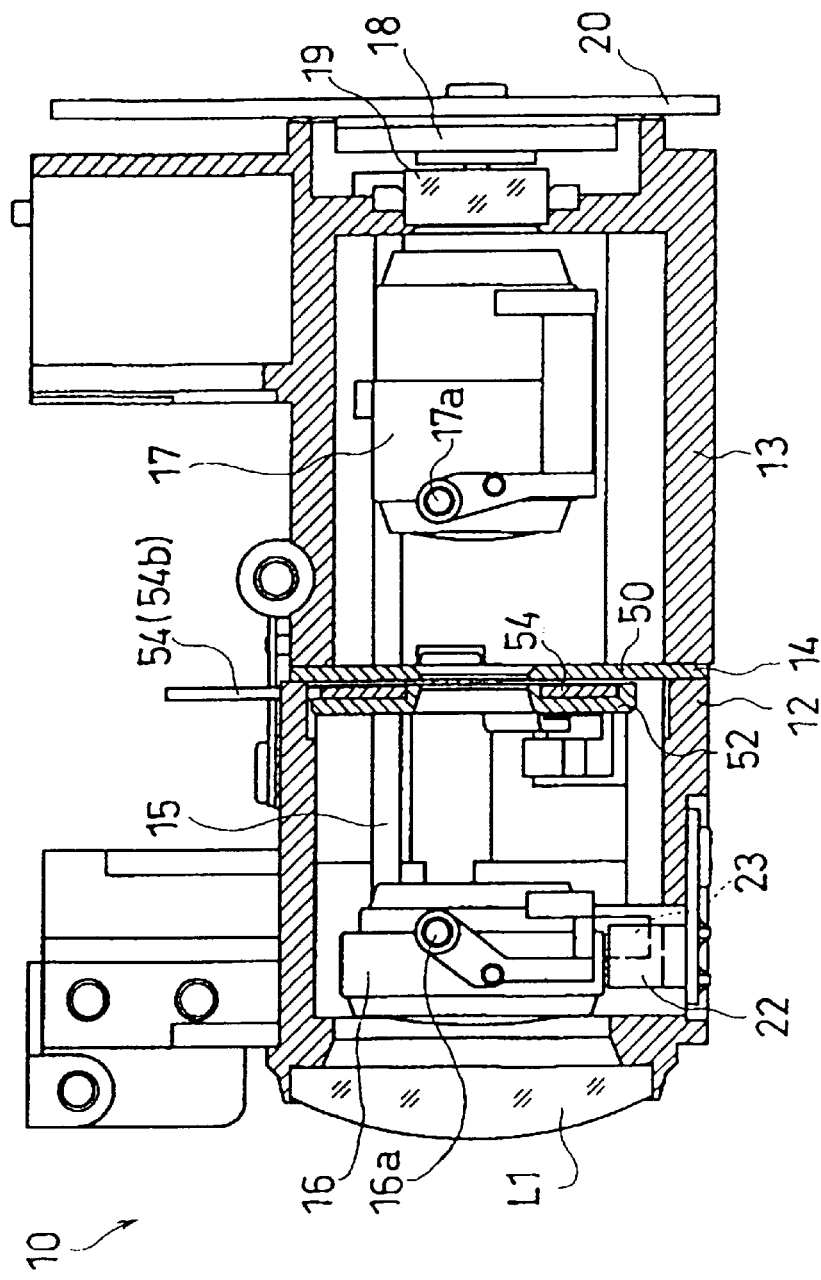
FIG. 12 is a cross sectional view of FIG. 11.

The mechanical structure of the zoom lens to which the present invention is applied will be explained below. The lens barrel body 10 provided in the lens casing 11 is essentially composed of a front plastic body 12, a rear plastic body 13 and a diaphragm block 14 held between the front and rear plastic bodies 12 and 13. There are a plurality of guide rods 15 (only one of which is shown in FIGS. 9, 10 and 12) which extend in parallel with the optical axis and by which a second lens frame 16 which holds the second lens group L2 and a third lens frame 17 which holds the third lens group L3 are movably guided. The CCD 18 is located behind the third lens frame 17 and is secured to the rear body 13 through the substrate 20 thereof. 19 designates the crystal filter. The casing 11 is provided with a glass cover (plane-parallel plate) 25 (FIGS. 4, 5 and 7) secured thereto and located in front of the first lens group L1.

The second lens frame 16 and the third lens frame 17 are respectively provided with upwardly extending second and third lens pins 16a and 17a. The second and third lens frames 16 and 17 are biased rearward (toward the CCD 18) by tensile springs 16b and 17b for removing backlash.

The front body 12 is provided with a photodetector (initial position sensor) 22 to detect the origin of the second lens frame 16 (second lens group L2). The second lens frame 16 is equipped with a dog plate 23 secured thereto to cooperate with the photodetector 22. In the illustrated embodiment, the origin of the second lens group L2 corresponds to an infinite object distance at the wide-angle extremity. When the second lens group L2 is located at the origin, the dog plate 23 interrupts the light from the photodetector 22 to detect the origin. The movement of the second lens group L2 from the origin is controlled by the lens controller 70 in accordance with the number of pulses for driving the second lens group L2. Alternatively, it is also possible to control the movement of the second lens group L2 from the origin using a pulser.

As may be supposed from the telephoto position shown in FIG. 9 and the wide-angle position shown in FIG. 10, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved always in opposite directions.

The drive mechanism which drives the second lens frame 16 and the third lens frame 17 in the lens barrel body 10 is assembled as a lens drive unit 30 which is attached to bridge the front body 12 and the rear body 13. The lens drive unit 30 will be discussed below with reference to FIGS. 4 through 7.

Figure 13:
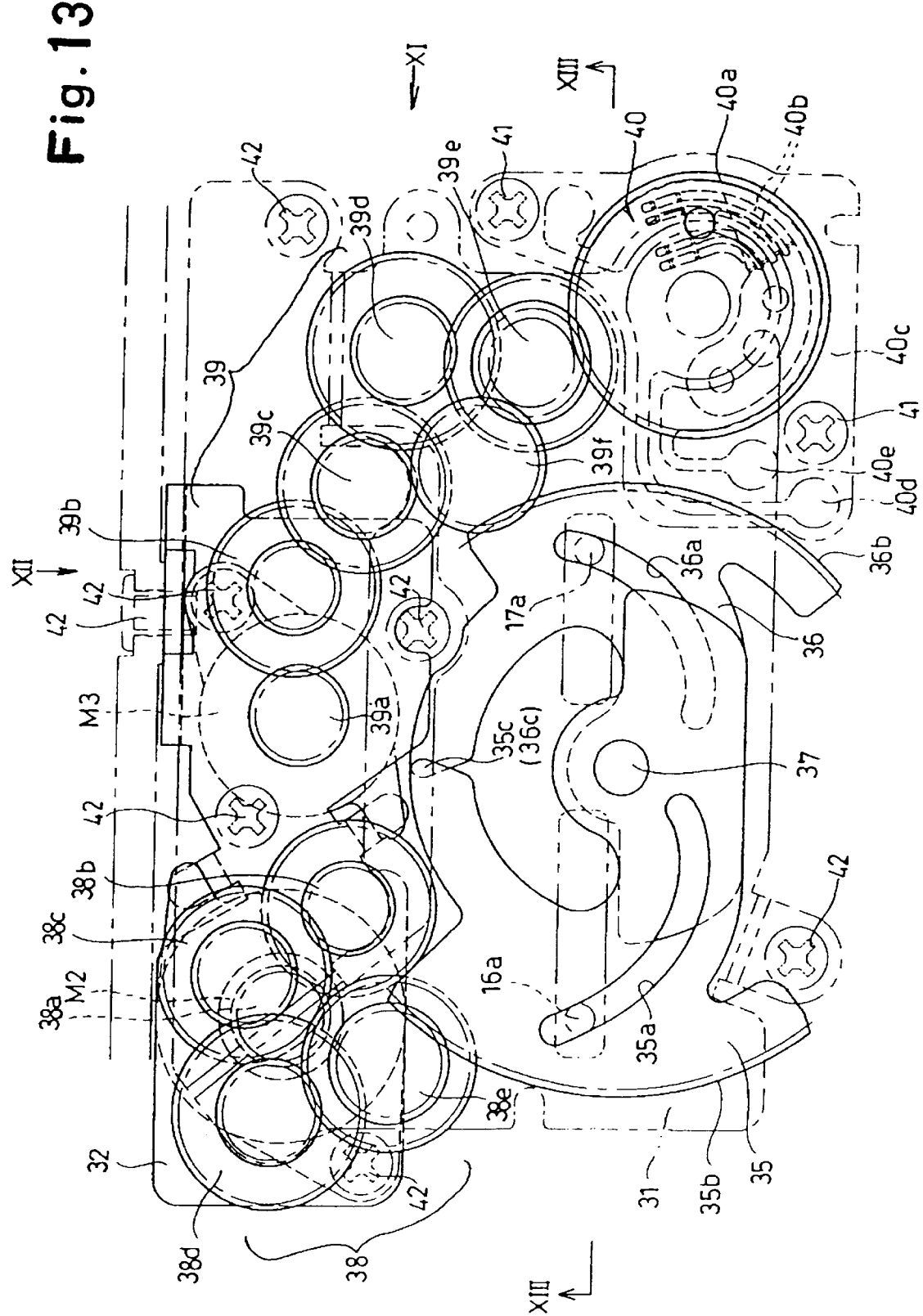
FIG. 13 is a plan view of a lens drive unit.
Figure 14:
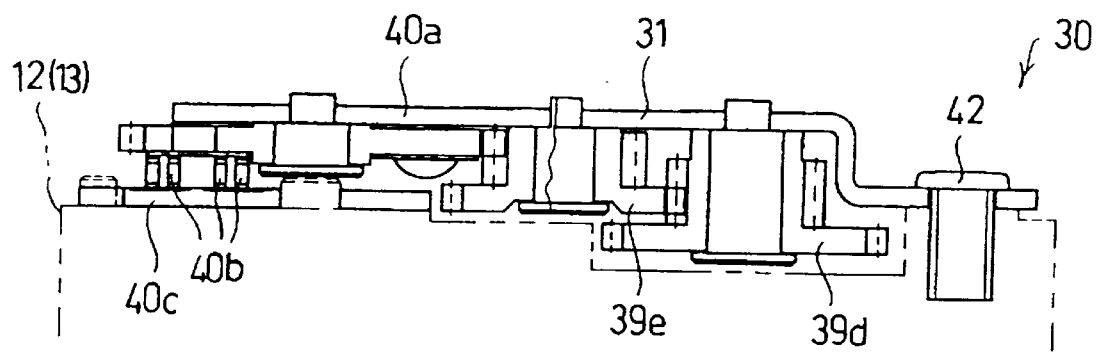
FIG. 14 is an end view viewed from the direction indicated at an arrow XI in FIG. 13.

The lens drive unit 30 is provided with first and second mother plates 31 and 32 which lie stepwise. In FIG. 13, for clarity, the upper first mother plate 31 is indicated by a dotted line and the lower second mother plate 32 is indicated by a solid line, respectively. The second lens pulse motor M2 and the third lens motor M3 are secured to the lower surface of the second mother plate 32 so that the drive shafts of the respective motors extend in a direction perpendicular to the second mother plate 32. A second lens drive plate 35 which is provided with a cam groove (lead groove) 35a in which the second lens cam pin 16a of the second lens frame 16 is fitted and a third lens drive plate 36 which is provided with a cam groove (lead groove) 36a in which the third lens cam pin 17a of the third lens frame 16 is fitted are coaxially pivoted to the first mother plate 31 through a common shaft 37. The second lens cam pin 16a and the third lens cam pin 17a are always pressed against the rear surfaces (adjacent to the CCD 18) of the cam grooves 35a and 36a by the tensile springs 16b and 17b, respectively, to eliminate backlash.

Between the first and second mother plates 31 and 32 there is a gear mechanism 38 which transmits the rotation of the second lens pulse motor M2 to the second lens drive plate 35, a gear mechanism 39 which transmits the rotation of the third lens motor M3 to the third lens drive plate 36, and a volume mechanism (variable resistor) 40. A first gear 38a secured to the output shaft of the second lens pulse motor M2 is functionally connected to a sector gear 35b formed on the outer peripheral surface of the second lens drive plate 35 through a second gear 38b, a third gear 38c, a fourth gear 38d and a fifth gear 38e. Each of the gears from the second gear 38b through to the fifth gear 38e are double gears.

A first gear 39a secured to the output shaft of the third lens motor M3 is functionally connected to a sector gear 36b formed on the outer peripheral surface of the third lens drive plate 36 through a second gear 39b, a third gear 39c, a fourth gear 39d, a fifth gear 39e and a sixth gear 39f. Each of the gears from the second gear 39b through to the fifth gear 39e are double gears. The fifth gear 39e is in mesh with the sixth gear 39f of the gear mechanism 39 and with a rotatable brush gear 40a of the volume mechanism 40. The brush gear 40a is provided on the rear surface thereof with a brush 40b secured thereto. A resistor plate 40c is secured to the rear body 13 independently of the lens drive unit 30 (before the lens drive unit 30 is attached), so that the resistor 40c comes into contact with the brush 40b. The resistance between two terminals 40d and 40e of the resistor plate 40c varies in accordance with the angular position of the brush gear 40a, and hence, the resistance corresponding to the angular position of the third lens drive plate 36, i.e., the position of the third lens frame 17 (third lens group L3) can be obtained.

The lens CPU 70 converts the resistance input thereto into positional data of the third lens group L3.

The second and third lens drive plates 35 and 36 are coaxially pivoted to the common shaft 37, as mentioned above. The profiles of the cam grooves 35a and 36a are such that when the second and third lens drive plates 35 and 36 rotate in the counterclockwise direction in FIG. 13, both the second lens frame 16 (second lens pin 16a) and the third lens frame 17 (third lens pin 17a) are moved forward. Since the second lens frame 16 (second lens group L2) and the third lens frame 17 (third lens group L3) are moved in opposite directions when the focal length varies, as mentioned above, the directions of the rotation of the second and third lens drive plates 35 and 36 upon zooming are always opposite when either the focal length is reduced from the telephoto extremity or the focal length is increased from the wide-angle extremity. With this arrangement in which the second and third lens drive plates 35 and 36 are rotatably mounted to the common shaft 37 and the rotation of the drive plates in opposite directions causes the second and third lens groups L2 and L3 to move in opposite directions, the lens barrel can be miniaturized.

Figure 15:
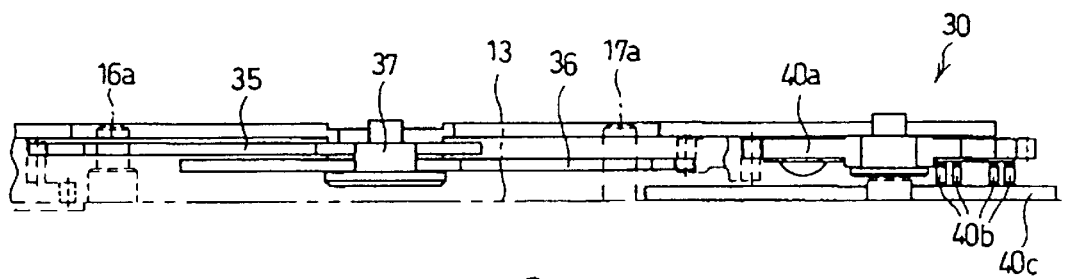
FIG. 15 is an end view viewed from the direction indicated at an arrow XII in FIG. 13.
Figure 16:
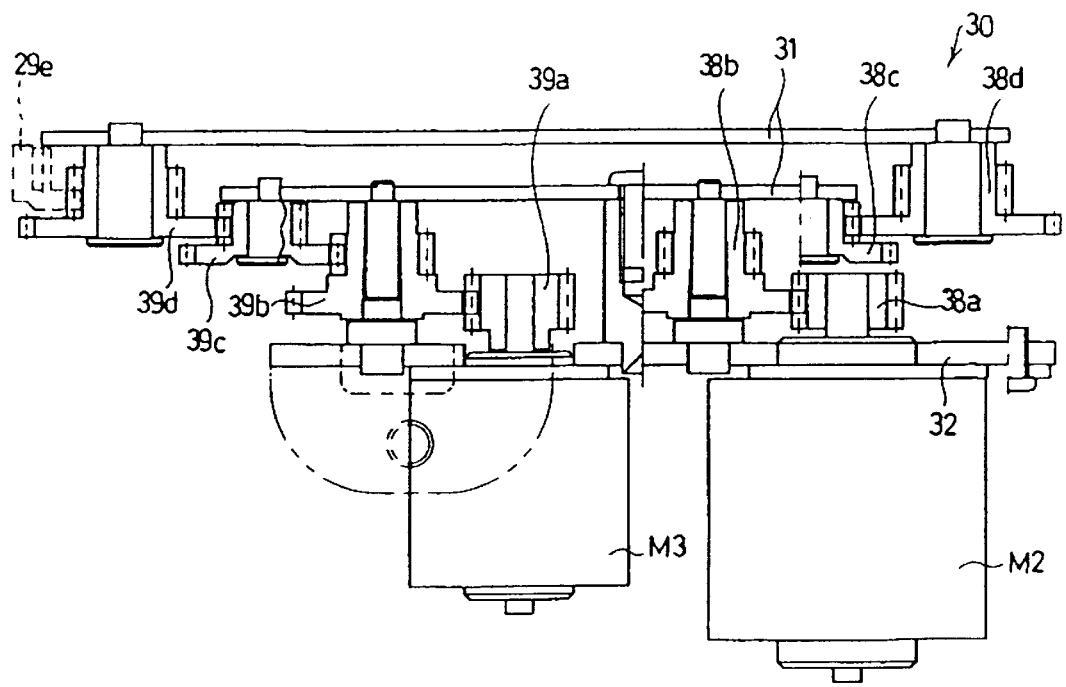
FIG. 16 is a sectional view taken along the line XIII—XIII in FIG. 13.
Figure 17:
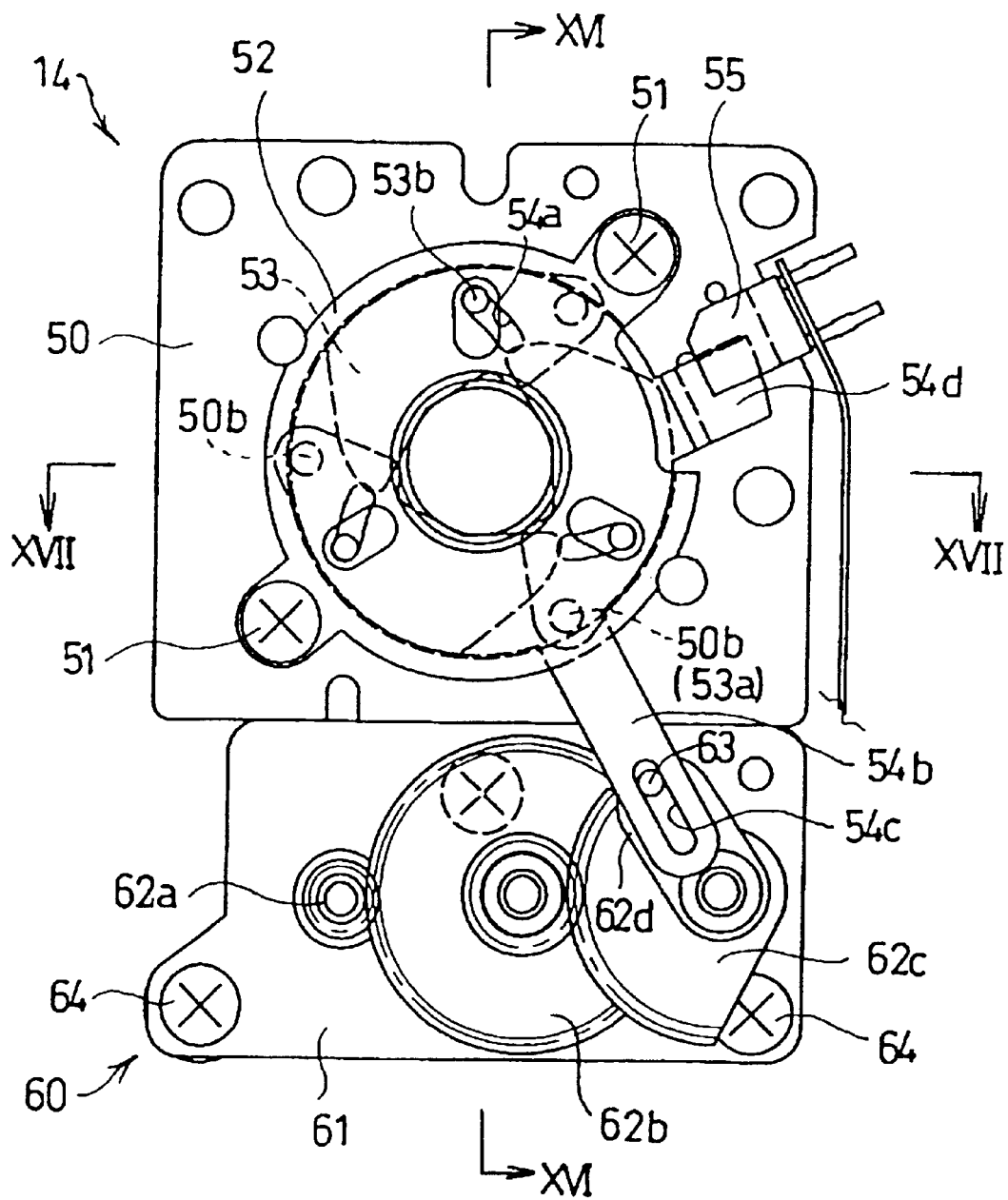
FIG. 17 is a front elevational view of a diaphragm drive unit in a full-open position of the diaphragm.
Figure 18:
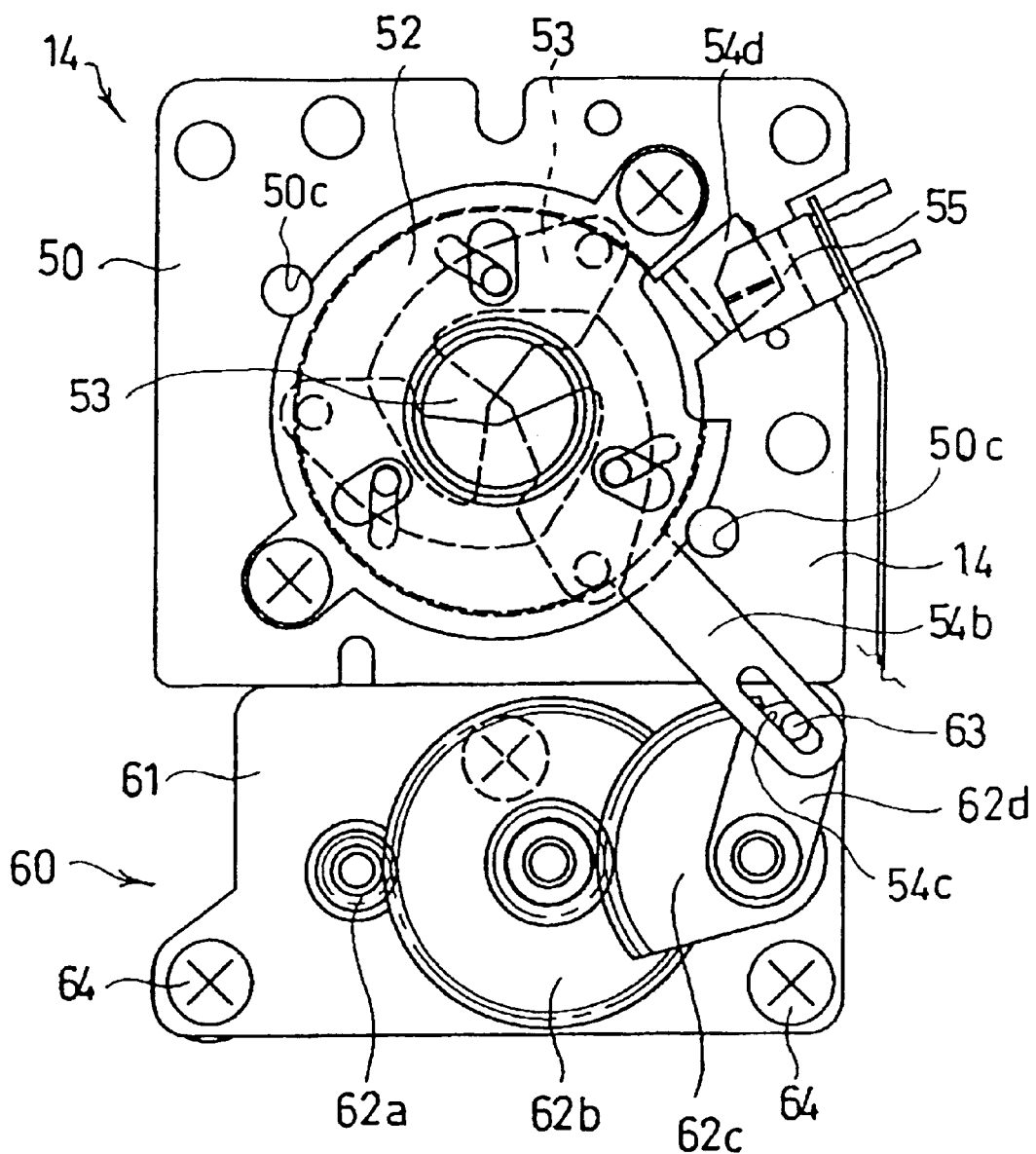
FIG. 18 is a front elevational view of a diaphragm drive unit in the smallest diaphragm position.
Figure 19:
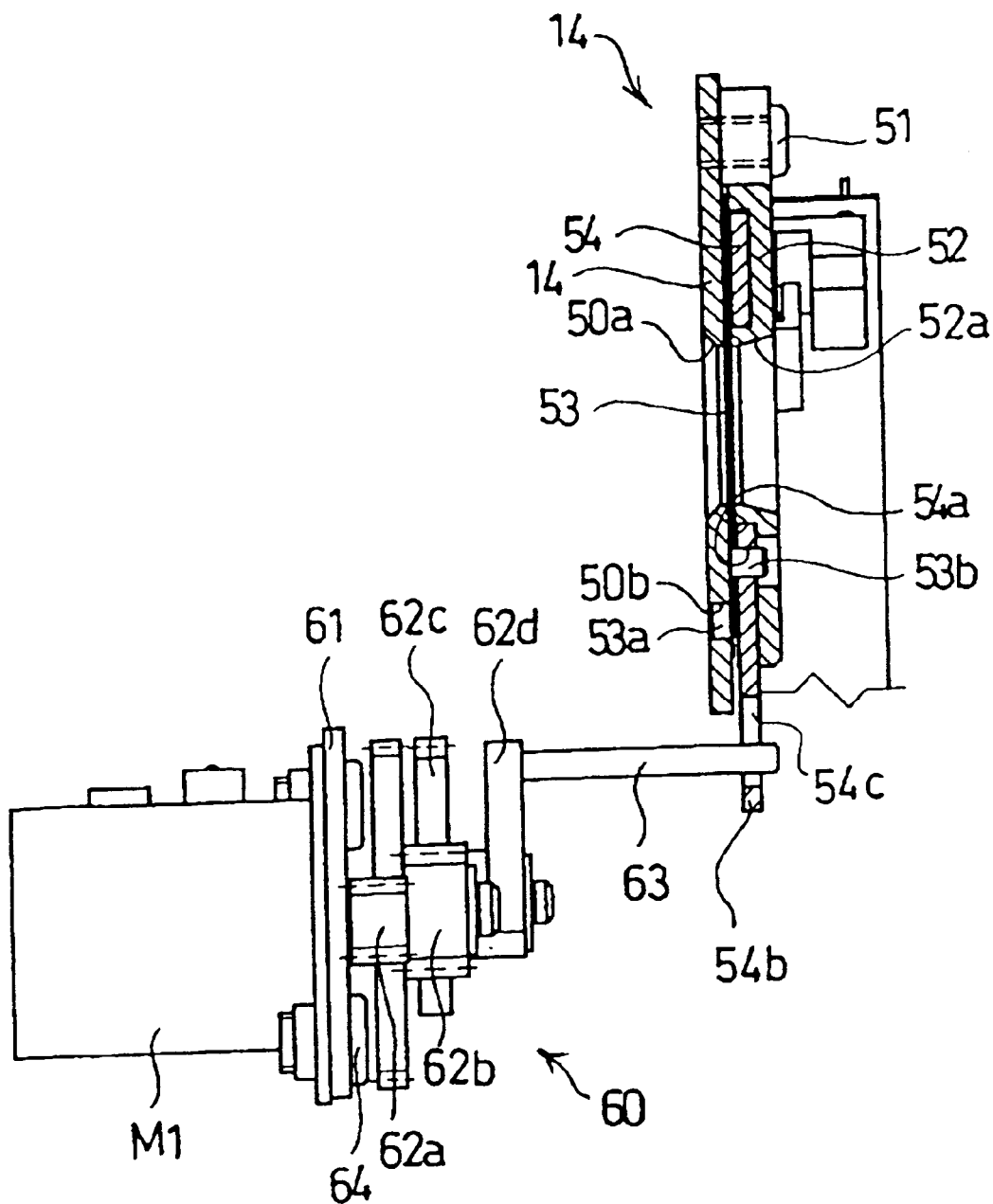
FIG. 19 is a sectional view taken along the line XVI—XVI in FIG. 17.
Figure 20:
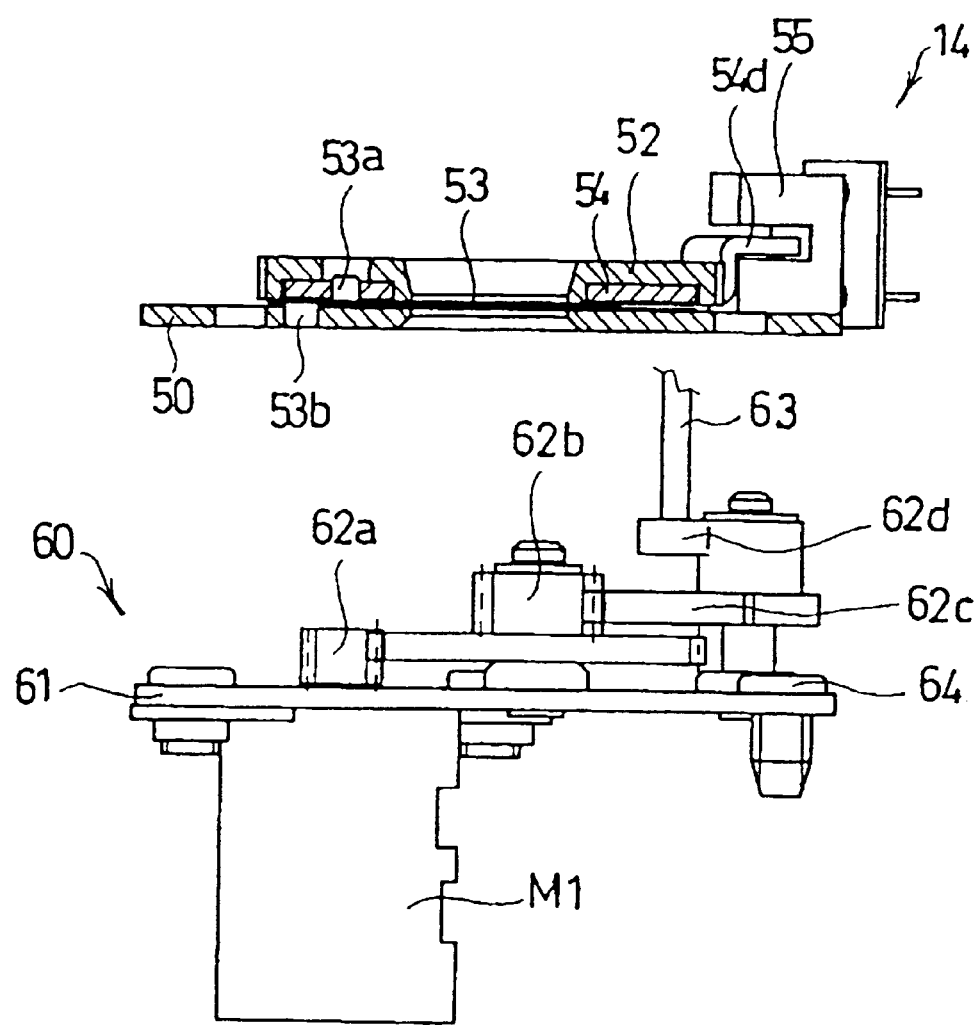
FIG. 20 is a sectional view taken along the line XVII—XVII in FIG. 17.

The second and third lens drive plates 35 and 36 are each made of a planar plate and are located at slightly different positions in the axial direction of the common shaft 37, as can be seen in FIGS. 13 and 15. If the second and third lens drive plates 35 and 36 are each made of a circular plate, they would not interfere with each other in any angular positions. However, each of the second and third lens drive plates is in the form of a generally sectoral shape to reduce the weight and to aid in overall miniaturization. However, if the second and third lens drive plates are each in the shape of a perfect sector, there is a possibility that they will interfere with each other at the front end surfaces thereof in the thickness direction, depending on the angular position, if the sector member deforms in the thickness direction.

To prevent possible interference, the second and third lens drive plates 35 and 36 are provided on the front ends thereof with wing portions 35c and 36c which overlap in a plan view when the maximum angular displacement of the drive plates in opposite directions takes place. In FIG. 13, the second lens drive plate 35 is rotated by the maximum angular displacement in the counterclockwise direction, and the third lens drive plate 36 is rotated by the maximum angular displacement in the clockwise direction. In this state, the wing portions 35c and 36c overlap in a plan view. In other words, the second and third lens drive plates 35 and 36 are each made of a generally sectoral shape plate which is made as small as possible and are provided on the front ends thereof with the wing portions 35c and 36c which partly overlap in a plan view, and thus, a smooth rotation of the second and third lens drive plates 35 and 36 can be ensured over the entire angular displacement.

The lens drive unit 30 (except for the resistor plate 40c) as constructed above is formed as a separate unit. The resistor plate 40c is secured to the rear body 13 by means of a plurality of screws 41 and is thereafter secured to the lens barrel body 10 (front body 12 and rear body 13) by means of a plurality of screws 42.

The diaphragm block 14 held between the front body 12 and the rear body 13 and the drive unit 60 therefor will be discussed below with reference to FIGS. 17 through 20. A substrate 50 of the diaphragm block 14 and a retainer 52 which is secured to the diaphragm block 14 by screws 51 are provided with apertures 50a and 52a on the optical axis, respectively. The substrate 50 is provided with a hole 50b formed around the aperture 50a, so that one of a pair of dowels 53b of diaphragm blades 53 is inserted in the hole 50b. There is an opening and closing ring 54 rotatably provided between the substrate 50 and the retainer 52. The opening and closing ring 54 is provided with a cam hole 54a in which the other dowel 53b of the diaphragm blade 53 is fitted. In the above-mentioned diaphragm mechanism which is per se known, when the opening and closing ring 54 is rotated, the size of the aperture defined by the blades 53 is varied between the full-open position and the smallest aperture.

The opening and closing ring 54 is provided with a radially extending diaphragm opening and closing arm 54b which is in turn provided with a radially extending association groove 54c. The photodetector (initial position sensor) 55 which detects the origin of the diaphragm mechanism is secured to the diaphragm block 14. The substrate 50 is provided with a dog 54d projecting therefrom, corresponding to the photodetector 55. In the illustrated embodiment, since the full-open position of the diaphragm (aperture) corresponds to the origin, the dog 54d interrupts light from the photodetector 55 to detect the origin. The diaphragm value (angular displacement of the opening and closing ring 54) when the aperture size is reduced from the full-open position by the opening and closing ring 54 is fed from the lens controller 70.

The diaphragm drive unit 60 as a separate unit is secured to the rear body 13 at a position different from the substrate 50 of the diaphragm block 14 in the optical axis direction and radial direction. The diaphragm pulse motor M1 is secured to the substrate 61 of the diaphragm drive unit 60. A first gear 62a secured to the output shaft of the diaphragm pulse motor M1 is connected to the sector gear 62c through a second gear 62b. The sector gear 62c is provided with a radial arm 62d integral therewith, which is in turn provided with an association pin 63 which is fitted in the radial association groove 54c of the opening and closing ring 54. The second gear 62b is a double gear.

Figure 11:
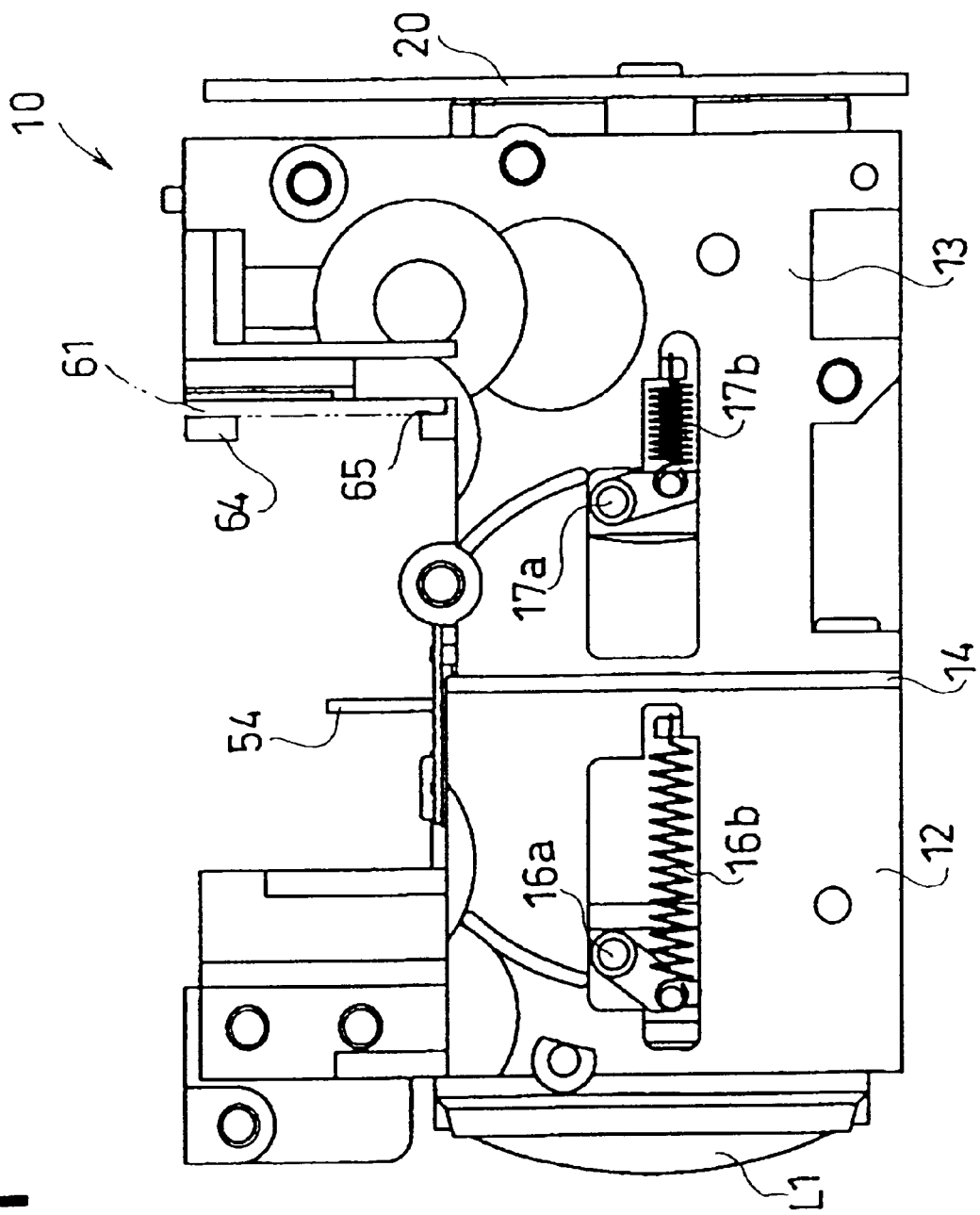
FIG. 11 is an end view viewed from the direction indicated at an arrow VIII in FIG. 8.

The diaphragm block 14 and the diaphragm drive unit 60 are each pre-assembled as a unit. The substrate 50 of the diaphragm block 14 is held between the front and rear bodies 12 and 13. The substrate 61 of the diaphragm drive unit 60 is secured to the rear body 13 by means of a plurality of screws 64, so that the association pin 63 is fitted in the radial association groove 54c of the opening and closing ring 54 and one end of the substrate 61 is held in a holding groove 65 (FIG. 11) of the rear body 13.

The lens casing 11 is connected to the body casing (not shown) through the cylindrical boss 81 (FIGS. 4 and 5) at a substantially central position so as to rotate by an angle less than 180°. The body casing is equipped with a zoom switch 71, a release switch 72, a signal processing circuit 75, memory 76; a liquid crystal display (LCD) panel with a finder function, in which the object image formed on the CCD 18 is displayed; a body CPU, and various switches, etc. The electric circuits in the body casing are connected to the electric circuits in the lens casing 11 through a body-lens connecting FPC board (flexible printed circuit board) 82 which extends through the cylindrical boss 81. Namely, the FPC board 82 connected to the CPU within the body casing is connected to a connector 83 provided on the substrate 20 and a connector 85 provided on an FPC board 84 on the lens side, through the cylindrical boss 81. The FPC board 84 on the lens side is provided with a printed circuit to which all the electrical elements within the casing 11 are connected and electronic devices such as the lens CPU 70, etc.

The components related to the barrel body 10, such as motors M1, M2 and M3, connected to the lens FPC board 84 are located above the cylindrical boss 81, and the lens CPU 70 is located below the cylindrical boss 81. Thus, the components such as the motors M1, M2, M3, etc., which generate an electric noise and the lens CPU 70 which tends to be influenced by noise are provided on opposite sides of the cylindrical boss 81. Consequently, no malfunction occurs.

The basic operation of the zoom lens barrel constructed as above operates as follows.

At the wide-angle extremity shown in FIG. 10, if the zoom switch 71 is moved toward the wide-angle position, the second lens frame 16 (second lens group L2) is moved forward through the second lens pulse motor M2, the gear mechanism 38 and the second lens drive plate 35; the third lens frame 17 (third lens group L3) is moved rearward through the third lens motor M3, the gear mechanism 39 and the third lens drive plate 36. Similarly, if the zoom switch 71 is moved toward the telephoto position at the telephoto extremity shown in FIG. 9, the second lens frame 16 (second lens group L2) is moved rearward and the third lens frame 17 (third lens group L3) is moved forward, respectively. The position of the second lens frame 16 is detected by the second lens initial position sensor 22 and in accordance with the number of the pulses for driving the second lens pulse motor M2. The absolute position of the third lens frame 17 is detected by the third lens volume 40.

In the zooming operation, the second lens pulse motor M2 and the third lens motor M3 are alternately supplied with the power to operate in accordance with the time-sharing system as shown in the timing chart in FIG. 3. In the illustrated embodiment, since a plurality of motors are alternately supplied with the power and are alternately driven, in accordance with the time-sharing system, as mentioned above, the peak value of the maximum power consumption can be reduced. Consequently, the service life of the battery can be increased and no mal-function of the apparatus due to a voltage drop occurs. If the power supply cycle is shortened, the same effect as that obtained when the second lens pulse motor M2 and the third lens motor M3 are driven simultaneously can be expected.

When the release switch 72 is depressed by half a step, the photometering system 73 and the focusing system 74 are activated to obtain object brightness data and object distance data. When the release switch 72 is depressed by a full step, the image pickup operation by the CCD 18 is carried out. Before the release switch 72 is fully depressed, the diaphragm of the diaphragm block 14 is set by the diaphragm pulse motor M1 in accordance with the object brightness data detected by the photometering system 73, based on the number of the drive pulses of the diaphragm pulse motor M1, and consequently, the second lens group L2 is moved by the second lens pulse motor M2 in the optical axis direction to a focal position in accordance with the set focal length data and the object distance data detected by the focusing system 74 while the position of the second lens group L2 is controlled through the second lens initial position sensor 22 in accordance with the number of the drive pulses. Namely, when the position of the third lens group L3 is determined in accordance with the focal length set by the zoom switch 71, the position of the second lens group L2 can be determined in accordance with the set focal length and the object distance data detected by the focusing system 74. Thus, an in-focus object image is formed on the CCD 18, so that the image pickup operation can be carried out.

If the photometering operation and the focusing operation continue while the power switch 93 is ON, the lens has been focused when the release switch 72 is depressed, and hence the image pick-up operation using the CCD 18 can be effected without a time lag. Namely, since the position of the second lens group L2 is determined in accordance with the set focal length and the object distance data detected by the focusing system 74 once the position of the third lens group L3 is determined, the image pickup operation can be carried out while an in-focus object image is formed on the CCD 18.

Although the above discussion has been directed to a digital camera having three motors, the present invention is not limited to the illustrated embodiment and can be generally applied to a camera having more than one motor.

As can be understood from the foregoing, according to the present invention, since more than one motor are driven in a time-sharing control system, the power is supplied to only one motor at one time, and hence the maximum power consumption can be restricted. Consequently, if the battery is used as a power source, the service life of the battery can be increased. Moreover, more than one motor can be driven as if they are driven simultaneously.

What is claimed is:

1. A time-sharing drive apparatus for a camera, comprising:
    a plurality of motors; and
    a motor drive control system comprising:
        (i) a plurality of drivers, one of said drivers provided for each of said plurality of motors, each said driver being configured to issue a driving signal to a respective one of said motors;
        (ii) a driver signal control device configured to generate a plurality of time allotments by dividing a predetermined cycle into a predetermined number greater than the number of said motors, said driver signal control device being configured to repeatedly issue drive signals to each of said motors at a predetermined sequence of said time allotments; and
    wherein each of said motors starts to drive according to the timing by which said drive signals are issued, and continues being driven over a duration corresponding to said time allotment.

2. A time-sharing drive apparatus according to claim 1, wherein said driver signal control device issues a different number of drive signals to one of said motors so that the amount of driving of said one motor per said predetermined cycle differs from the amount of driving of other said motors.

3. A time-sharing drive apparatus according to claim 1, further comprising:
    a photographing optical system including at least two optical systems, in which a focal length can be set by varying relative positions of each of said two optical systems;
    a motor being provided for each said optical system, and one of said motors being provided for an optical system related to focusing; and
    wherein said drive signal control device issues a drive signal to said one motor for the optical system related to focusing after another drive signal has been issued to another of said motors for another of said optical systems.

4. A time-sharing drive apparatus according to claim 2, further comprising:
    a photographing optical system including at least two optical systems, in which a focal length can be set by varying relative positions of each of said two optical systems;
    a motor being provided for each said optical system, and one of said motors being provided for an optical system related to focusing; and
    wherein said drive signal control device issues more drive signals to said one motor related to focusing than to other said motors.

5. A time-sharing drive apparatus according to claim 3, further comprising a focusing system which detects the focal length and the object distance of said zoom lens producing focal length data and object distance data thereof; said motor drive control system drives said one motor during said first and third time allotments and drives said third motor during the second time allotment of said cycles based on said focal length data and said object distance data detected by said focusing system.

6. A time-sharing drive apparatus according to claim 5, wherein said camera includes a photographing lens, a first motor which opens and closes a diaphragm of said photographing lens, and said one motor moves a focusing lens of said photographing lens.

7. A time-sharing drive apparatus according to claim 5, wherein said camera includes a photographing lens having at least two lens groups which relatively move towards each other or apart from each other allowing a variable focal length, and wherein said each of said at least two lens groups has one of said plurality of motors to drive said each of at least two lens groups for a zooming operation.

8. A time-sharing drive apparatus according to claim 5, wherein said camera includes a zoom lens and a diaphragm, and wherein said motors include a first motor which opens and closes said diaphragm of said zoom lens, said one motor which moves a focusing lens of said zoom lens, and a third motor for said zooming operation of said zoom lens.

9. A time-sharing drive apparatus according to claim 5, wherein said camera includes a zoom lens provided with a second movable lens group and a third movable lens group, and wherein said motors include a first motor which opens and closes a diaphragm of said zoom lens, said second motor which moves said second lens group, and a third motor which drives said third lens group.

10. A time-sharing drive apparatus according to claim 9, wherein cycles of time allotments to be allocated to said motors to drive said motors are made different by said motor drive control system.

11. A time-sharing drive apparatus according to claim 10, wherein time allotments in which said motors are driven are made different by said motor drive control system.

12. A time-sharing drive apparatus according to claim 9, wherein said motor drive control system defines four time allotments for one cycle and allocates one time allotment to each of said first and third motors to drive said same, and allocates two time allotments to said second motor to drive said same, respectively, so that said cycles are repeated to drive said first, second and third motors.

13. A time-sharing drive apparatus according to claim 9, wherein said motor drive control system defines four time allotments for one cycle and allocates said first and third time allotments to said second motor to drive said same and allocates second and fourth time allotments to said third and first motors, respectively, to drive said same so that said cycles are repeated to drive said first, second and third motors.

14. A time-sharing drive apparatus according to claim 9, wherein said motor drive control system defines a first time allotment to said one motor to move focusing lens group, a second time allotment to said third motor to move another lens group, third time allotment to said second motor, and fourth time allotment to said first motor, respectively, to drive said same so that said cycles are repeated to drive said first, said one and said third motors.

15. A time-sharing drive apparatus according to claim 14, further comprising a photometering system which measures the object brightness and detects the number of drive pulses of said first motor in accordance with said object brightness; said motor drive control system drives said first motor based on said number of said drive pulses during said forth time allotment of said cycles.

16. A time-sharing drive apparatus according to claim 14, further comprising a zoom switch, whereby when said zoom switch is actuated, said motor drive control system drives said one motor during said first and third time allotments and drives said third motor during said second time allotment of said cycles.

17. A time-sharing drive apparatus according to claim 14, further comprising a focusing system which detects the focal length and the object distance of said zoom lens producing focal length data and object distance data thereof; said motor drive control system drives said one motor during said first and third time allotments and drives said third motor during the second time allotment of said cycles based on said focal length data and said object distance data detected by said focusing system.

18. A time-sharing drive apparatus according to claim 9, wherein said motors are stepping motors which are each driven by one step in said respective time allotments.

19. A time-sharing drive apparatus according to claim 9, wherein said camera includes a color image pickup means and a memory means in which an image signal picked-up by said color image pickup means is stored as a digital image data.

20. A time-sharing drive apparatus according to claim 7, wherein cycles of time allotments to be allocated to said motors to drive said motors are made different by said motor drive control system.

21. A time-sharing drive apparatus according to claim 20, wherein said motor drive control system defines a first time allotment to said one motor to move focusing lens group, a second time allotment to a third motor to move another lens group, and third time allotment to said second motor respectively, to drive said same so that said cycles are repeated to drive said one and said third motors.

22. A time-sharing drive apparatus according to claim 21, further comprising a zoom switch, whereby when said zoom switch is actuated, said motor drive control system drives said one motor during said first and third time allotments and drives said third motor during said second time allotment of said cycles.

23. A time-sharing drive apparatus according to claim 21, wherein said drive signal control device issues a sequence of said drive signals to said one motor related to focusing, said sequence being every other one with any drive signal issued to another said motor.

* * * * *